UNITED STATES PATENT OFFICE.

HENRI TERRISSE, OF GENEVA, SWITZERLAND, ASSIGNOR, BY DIRECT AND MESNE ASSIGNMENTS, OF SIXTY ONE-HUNDREDTHS TO THE INDESTRUCTIBLE PAINT COMPANY, LIMITED, OF LONDON, ENGLAND, AND FORTY ONE-HUNDREDTHS TO ELLIS-FOSTER COMPANY, OF MONTCLAIR, NEW JERSEY, A CORPORATION.

ESTERIFIED FOSSIL RESIN AND PROCESS OF MAKING SAME.

1,236,996.      Specification of Letters Patent.      Patented Aug. 14, 1917.

No Drawing.      Application filed April 22, 1915. Serial No. 23,164.

*To all whom it may concern:*

Be it known that I, HENRI TERRISSE, of 5 Florissant, Geneva, Switzerland, have invented certain new and useful Improvements in Esterified Fossil Resins and Processes of Making Same, of which the following is a specification.

This invention relates to the production of esterified fossil resins. The invention is more particularly intended for the production of glycerin esters or other polyhydric esters of the acids of fossil resins, but it can be applied for the manufacture of fossil resin esters generally, including those of linalool and other high boiling alcohols.

It is well known that esters of glycerin with the acids present in colophony and other soft pinous resins can readily be produced, but hitherto no process has been devised by which the fossil resins can be esterified either in their native state or after fusion in a gumpot or otherwise.

I have found that fossil resins (including Kongo copal, Zanzibar and Madagascar anim, kauri, Benguela copal, Pontianak, Manila and others) can be esterified after having been subjected to a "depolymerizing" or solubilizing treatment whereby they are rendered soluble in linseed oil or other siccative oils, said treatment being hereinafter referred to as "solubilizing," and the solubilized bodies as solubilized fossil resins or products. In particular I have found that the resin acids present in such resins will then combine directly and permanently with glycerin and other high boiling alcohols and form esters.

The "depolymerizing" or solubilizing treatment of the fossil resins to enable esterification to proceed as above referred to may consist in heating the same, preferably under pressure in an autoclave, at a suitable temperature varying with the nature of the resin and the character of the treatment. Solvents, such for example as phenol, cresol, naphthalene, copal oil, resin oil, linseed or other siccative oil and so forth, may be added as referred to in the said Henri Terrisse's British patent specifications Nos. 14554 of 1903 and 23039 of 1908, and the depolymerizing or solubilizing treatment of the fossil resins may be carried out in accordance with the processes of the said specifications, I having found that this treatment renders the resins amenable to the desired esterification.

The temperature at which the depolymerizing or solubilizing treatment is conducted may in general lie between about 240° C. and 360° C. according to the nature of the resin and the character of the treatment as above mentioned, but I do not confine myself to these limits.

In carrying out the present invention I may proceed as follows:—

The fossil resin which it is desired to esterify is first subjected to depolymerization as above described to such an extent as to render it soluble in linseed oil, by heating the resin with or without naphthalene or phenol or other suitable solvent at a suitable temperature in an autoclave under pressure as above described. The naphthalene or phenol or other suitable diluent employed may be removed by distillation or other convenient means. Thereafter the free acid value of the fused resin is determined, and a quantity of a high boiling alcohol, for instance, glycerin, more than sufficient to combine with such free acid is added. The mixture is then heated until the excess of glycerin or other alcohol is distilled off after which the product is found to consist substantially of a true resin acid ester which dissolves readily in linseed oil and which is free from acidity.

I have further found that fossil resin which has been fused in the ordinary open pot method or other method, can be esterified if it is first mixed or treated with a suitable quantity of copal oil (which may advantageously have been redistilled preferably under reduced pressure). Or the process of "depolymerization" and esterification may be combined into one operation.

Example 1: 100 grams of ground Zanzibar gum are heated under a pressure of 4 atmospheres with 350 grams of naphthalene at 280° C. for about 4 hours or until a test sample is found to be soluble in linseed oil. The index of acidity of the fused resin is then determined and the quantity of glycerin to be employed is calculated in accordance with the soda or potash acidity index. Glycerin in some excess of this amount is then added to the mass in a still or open vessel, and the whole is heated at 280–320° C. until a test sample spread on a glass plate remains transparent on cooling.

Example 2: 100 kilos of Kongo copal fused by the ordinary open pot method is taken, its acidity index determined and the amount of glycerin calculated in correspondence with the soda or potash acidity index. There is then added 15 kilos copal oil which has been redistilled under reduced pressure to the state of a greenish yellow viscous liquid. The mixture is introduced into a still or open vessel and raised to 280° C. At this temperature a quantity of glycerin in excess of the calculated amount is added, say about 5 to 6 kilos of glycerin, and the heating is continued until a test gives a clear bead.

The present invention is very valuable for the varnish and paint industries, as it allows of obtaining fossil resin products of a very neutral or non-acid character which are much more durable than crude fused resins, do not coagulate zinc whites and withstand climatic influences to a much greater extent.

The invention comprises as new products the glycerin and other esters of high boiling alcohols with the acids of fossil resins.

What I claim and desire to secure by Letters Patent is:—

1. Process for the manufacture of esterified resin, comprising esterifying a solubilized fossil resin.

2. Process for the manufacture of esterified fossil resin comprising esterifying a solubilized fossil resin by heating the same with a high boiling alcohol.

3. Process for the manufacture of esterified fossil resin, comprising esterifying a solubilized fossil resin by heating the same with glycerin at about 280° to 320° C.

4. Process for the manufacture of esterified fossil resin, comprising esterifying a solubilized fossil resin by heating the same with a high boiling alcohol and subsequently distilling off the alcohol.

5. Process for the manufacture of esterified fossil resin, comprising esterifying a solubilized fossil resin by heating the same with glycerin and subsequently distilling off the alcohol.

6. Process for the manufacture of esterified fossil resin, comprising solubilizing the fossil resin by heating the same, and esterifying the solubilized product by heating it with a high boiling alcohol.

7. Process for the manufacture of esterified fossil resin, comprising solubilizing the fossil resin by heating the same under pressure, and esterifying the solubilized product by heating it with a high boiling alcohol.

8. Process for the manufacture of esterified fossil resin, comprising solubilizing the fossil resin by heating the same with a solvent, and esterifying the solubilized product by heating it with a high boiling alcohol.

9. Process for the manufacture of esterified fossil resin, comprising solubilizing the fossil resin by heating the same under pressure with a solvent, and esterifying the solubilized product by heating it with a high boiling alcohol.

10. Process for the manufacture of esterified fossil resin, comprising solubilizing the fossil resin by heating the same and esterifying the solubilized product by heating it with glycerin.

11. Process for the manufacture of esterified fossil resin, comprising solubilizing the fossil resin by heating the same with a solvent, and esterifying the solubilized product by heating it with glycerin.

12. Process for the manufacture of esterified fossil resin, comprising solubilizing the fossil resin by heating the same under pressure and esterifying the solubilized product by heating it with gylcerin.

13. Process for the manufacture of esterified fossil resin, comprising solubilizing the fossil resin by heating the same under pressure with a solvent, and esterifying the solubilized product by heating it with glycerin.

14. Process for the manufacture of esterified fossil resin, comprising solubilizing the fossil resin by heating the same at about 240°–360° C. and esterifying the solubilized product by heating it with glycerin.

15. Process for the manufacture of esterified fossil resin, comprising solubilizing the fossil resin by heating the same under pressure at about 240°–360° C. and esterifying the solubilized product by heating it with glycerin.

16. Process for the manufacture of esterified fossil resin, comprising solubilizing the fossil resin by heating the same under pressure at about 240°–360° C. with a solvent, and esterifying the solubilized product by heating it with glycerin.

17. Process for the manufacture of esterified fossil resin, comprising solubilizing the fossil resin by heating the same and esterifying the solubilized product by heating it with glycerin at about 280°–320° C.

18. Process for the manufacture of esterified fossil resin, comprising solubilizing the fossil resin by heating the same with a solvent, and esterifying the solubilized product by heating it with glycerin at about 280°–320° C.

19. Process for the manufacture of esterified fossil resin, comprising solubilizing the fossil resin by heating the same under pressure at about 240°–360° C. with a solvent, and esterifying the solubilized product by heating it with glycerin at about 280°–320° C.

20. Process for the manufacture of esterified fossil resin comprising heating a mixture of fused fossil resin and copal oil, with a high boiling alcohol.

21. Process for the manufacture of esterified fossil resin comprising heating a mixture of fused fossil resin and redistilled copal oil with a high boiling alcohol.

22. Process for the manufacture of esterified fossil resin, comprising heating a mixture of fused fossil resin and copal oil with glycerin.

23. Process for the manufacture of esterified fossil resin, comprising heating a mixture of fused fossil resin and redistilled copal oil with glycerin.

24. Process for the manufacture of esterified fossil resin, comprising heating with glycerin a mixture of fused fossil resin and copal oil which has been redistilled to a greenish-yellow viscous liquid.

25. Process for the manufacture of esterified fossil resin, comprising heating a mixture of fused fossil resin and redistilled copal oil with glycerin at about 280° C.

26. Process for the manufacture of esterified fossil resin, comprising fusing fossil resin, mixing or treating the fused product with copal oil and heating with a high boiling alcohol.

27. Process for the manufacture of esterified fossil resin, comprising fusing fossil resin, mixing or treating the fused product with copal oil, and heating with glycerin.

28. Process for the manufacture of esterified fossil resin, comprising fusing fossil resin, mixing or treating the fused product with redistilled copal oil, and heating with glycerin.

29. As a new article of manufacture an esterified fossil resin.

30. As new products the esters of high boiling alcohols with the acids of fossil resins.

31. As a new article of manufacture, a glycerin ester of a fossil resin.

32. As a new article of manufacture, esterified fossil resin possessing the properties of non-acidity and of not coagulating zinc whites.

33. The process of making a Zanzibar copal substitute which comprises esterifying Kongo copal gum with glycerin at a temperature above the boiling point of glycerin and subsequently heating the esterified product until it becomes soluble in varnish solvents.

In testimony whereof I have signed my name to this specification in the presence of two subscribing witnesses.

HENRI TERRISSE.

Witnesses:
ROBERT MILTON SPEARPOINT.
ORLANDO J. WORTH.